INVENTOR.
MARION W. HUMPHREYS
BY
Kwis Hudson & Kent
ATTORNEYS

Feb. 20, 1945.   M. W. HUMPHREYS   2,369,828

MACHINE FOR DRILLING HOLES IN SCREWHEADS AND THE LIKE

Filed Jan. 2, 1943   3 Sheets-Sheet 2

INVENTOR.
BY MARION W. HUMPHREYS
Kwis Hudson & Kent
ATTORNEYS

Feb. 20, 1945.       M. W. HUMPHREYS       2,369,828
MACHINE FOR DRILLING HOLES IN SCREWHEADS AND THE LIKE
Filed Jan. 2, 1943       3 Sheets-Sheet 3

INVENTOR.
MARION W. HUMPHREYS
BY
Kwis Hudson & Kent
ATTORNEYS

Patented Feb. 20, 1945

2,369,828

UNITED STATES PATENT OFFICE 2,369,828

MACHINE FOR DRILLING HOLES IN SCREWHEADS AND THE LIKE

Marion W. Humphreys, Euclid, Ohio

Application January 2, 1943, Serial No. 471,188

7 Claims. (Cl. 77—27)

This invention relates to a machine for drilling holes in the heads of screws or bolts.

The object of the invention is to provide a machine which is simple in operation and compact in construction and which very effectively drills the various holes in the screw heads.

The machine comprises a device for supporting in vertical position a screw in proper relation to a vertically movable drill which drills a hole axially in the screw head, and a plurality of drills, in this instance six, which drill holes laterally into the bore or hole that is formed by the first named drill. Additionally, it comprises a hydraulic motor which is controlled by a lever operating a three-way valve which admits fluid slowly to one end of the cylinder, slowly forcing the piston of the motor in one direction. The piston of the motor operates through mechanism to be described a cam which moves first the drill which drills the hole in the head of the screw and then the drills which drill the small holes axially into the bore. When the piston movement is completed, the drills have all performed their work. Then on throwing the lever in the opposite direction, the drills are again caused to function rapidly so as to remove what burr there has been produced by the drilling operations. The drills are operated at the desired speed by an electric motor. After the screw has been drilled and the drills have been retracted to their normal positions, the screw is removed and manually replaced with a new screw to be drilled, and then the operations are repeated.

The invention may be further summarized as consisting in certain novel details of construction and combinations and arrangements of parts which will be described in the specification and set forth in the appended claims.

In the accompanying sheets of drawings wherein I have shown the preferred embodiment of the invention.

Fig. 2 is a top plan view of the machine with the screw receiving or positioning device at the top of the machine removed;

Figure 1:
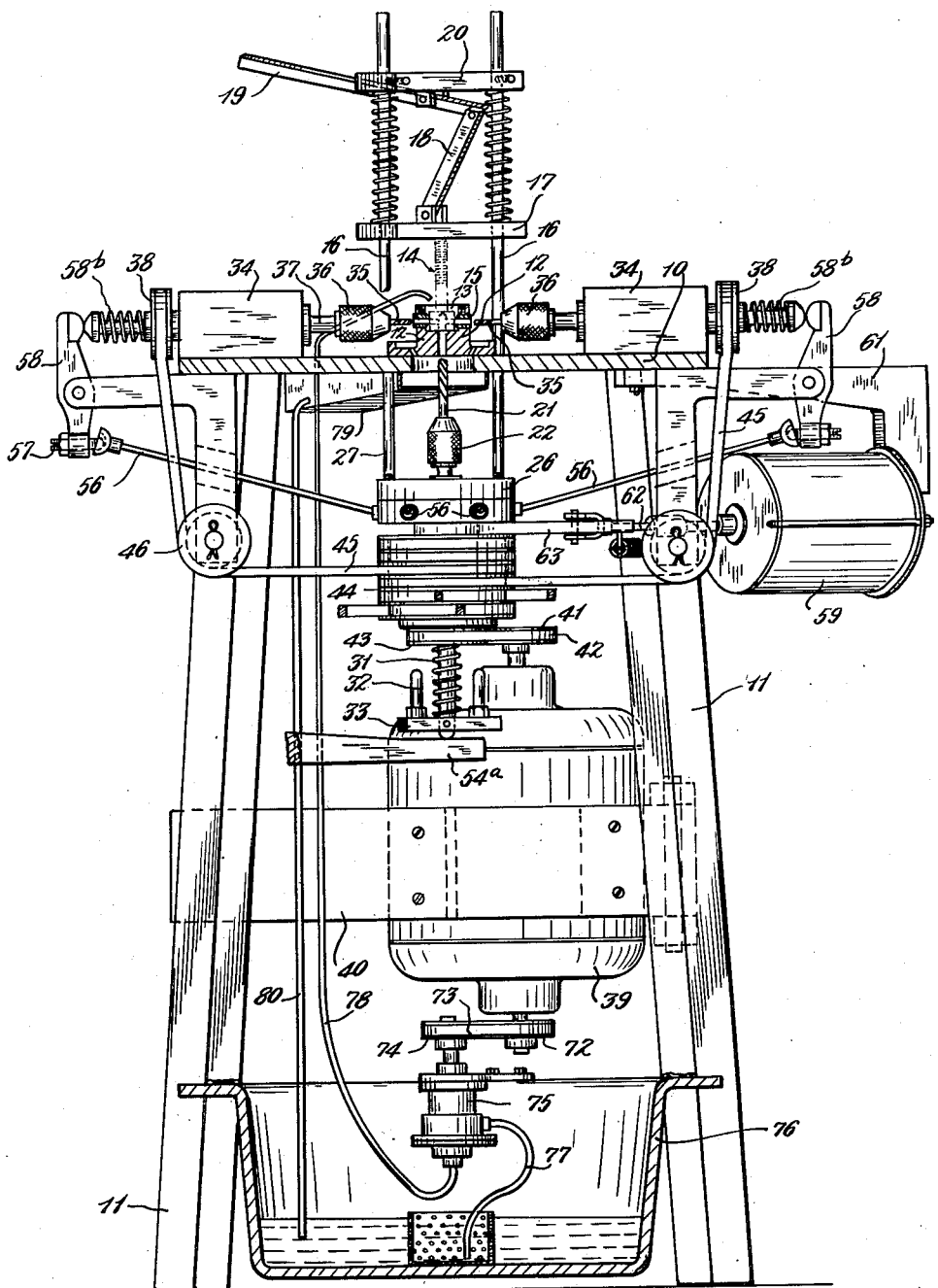
Fig. 1 is a view partly in side elevation and partly in vertical section substantially along the line I—I of Fig. 2.

Referring now to the drawings, 10 represents a circular table which is supported at a given height above the floor by three legs 11 (see Figs. 1 and 2). Fixed to the center of the table is a screw receiving member 12 which has a socket 13 (see particularly Figs. 3 and 4) which is shaped to receive the polygonal (in this instance hexagonal) head of the screw 14.

Figure 7:
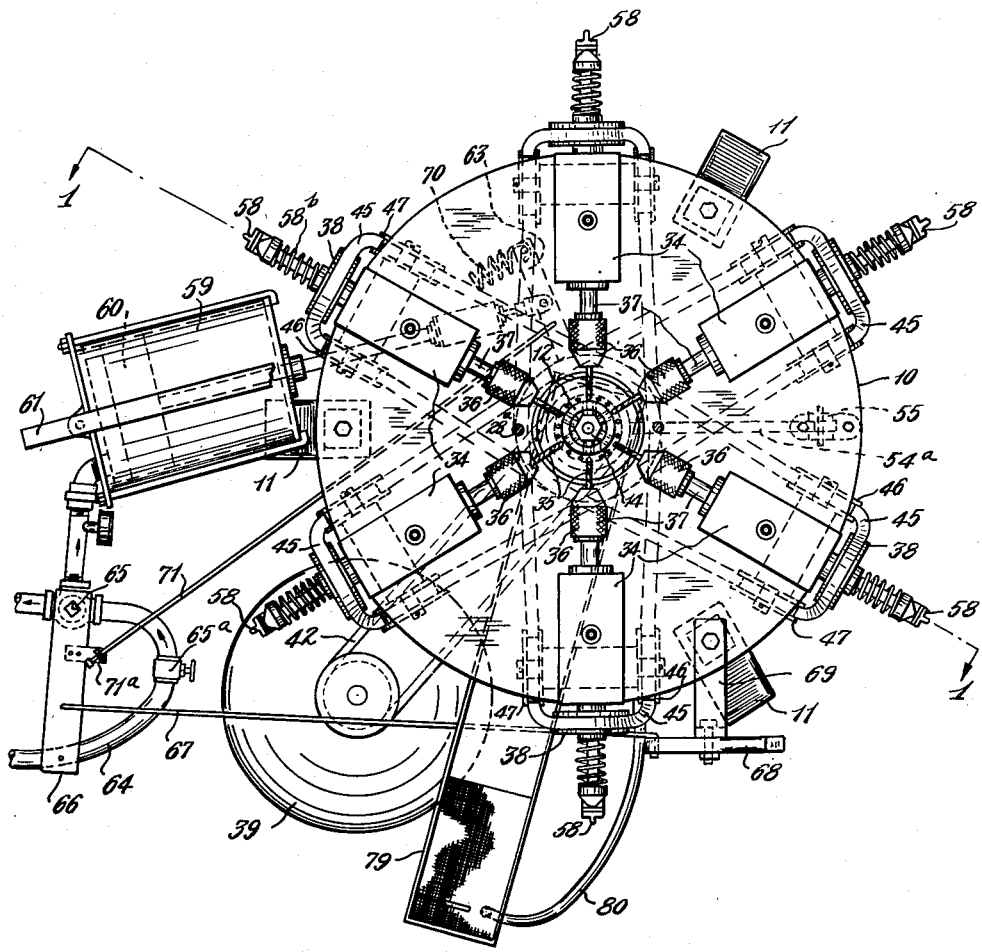
Fig. 7 is an end view of the drilled head of the screw.
Figure 6:
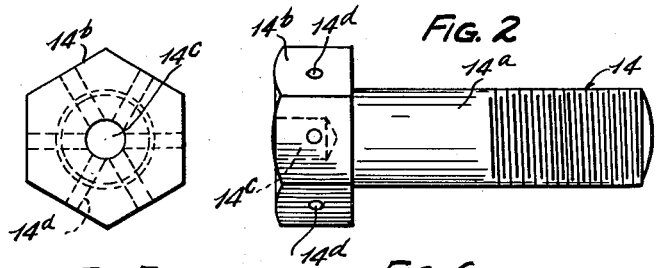
Fig. 6 is a side elevation on an enlarged scale showing one of the drilled screws.

When the screw is placed in the machine ready to have the holes drilled therein, the head of the screw is placed in the socket 13 and the threaded shank of the screw extends upwardly therefrom. At this point I might refer briefly to the screw shown in Figs. 6 and 7 which screw has been drilled. In these views the shank of the screw is designated 14a and the head 14b, the hole which is drilled centrally of the head of the screw in line with the axis of the shank is designated 14c and the six holes which are drilled from the six sides of the head to the hole 14c are designated 14d. It is the purpose of this invention to drill the axial hole 14c and the transversely extending holes 14d.

The member 12 is double cup-shaped, and extending in an axial direction through the walls of the socket 13 are adjustable bushings 15 to take the axially extending drills, six in number. These drills are held in position by vertically extending screws which extend from the top of the member 12. The head of the screw to be drilled is such that the six sides of the head 14b engage the inner ends of these bushings. It will be understood that if different sizes of screws are to be drilled, the bushings can be moved inwardly or outwardly to accommodate the particular size of screw to be drilled.

On opposite sides of the screw receiving member 12 are a pair of upstanding rods 16 having a spring pressed abutment 17 which is adapted to engage the upper end of the shank of the screw and thus hold the screw in position while it is being drilled. To permit the insertion or removal of a screw, this abutment 17 can be moved vertically by a link 18 connected to a hand lever 19, this hand lever being carried by a fixed abutment 20.

Figures 3, 4, 5:
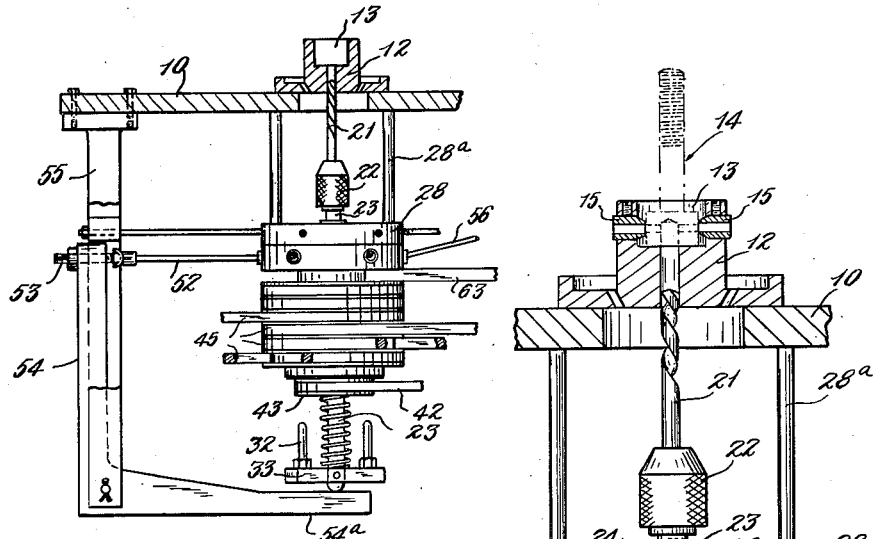
Fig. 3 is a side elevation of part of the mechanism including the means for operating the various drills and the cam operating means for moving the drills in and out, parts being in section.
Fig. 4 is a vertical sectional view of the apparatus on an enlarged scale, parts being omitted.
Fig. 5 is a detail sectional view showing particularly the cam, this view being taken approximately along the line 5—5 of Fig. 4.

For the purpose of drilling the axial hole 14c in the screw head there is provided a vertically arranged drill 21 secured in the socket 22 of a spindle 23 which has a slot and pin or key connection 24 with a driving sleeve 25 supported by upper and lower ball bearings 26 in a sleeve 27 secured in and depending from a platform 28 connected by depending lugs 28a from the table 10 (see Fig. 4). Secured by a setscrew 29 to the driving sleeve 25 is a driving member 30. A spring 31 which surrounds the lower end of the spindle 23 allows the spindle to be elevated until a pair of adjustable pins 32 on a support 33 fixed to the lower end of the spindle 23 come into contact with the lower end of the driving member 30. The manner in which this spindle is elevated will be referred to presently.

As will be explained later, the hole 14c in the screw 14 is first drilled into the screw while the screw is positioned as shown by dotted lines in Fig. 4 in the socket 13 of the screw receiving member 12.

As soon as the drill 21 is retracted, the six holes 14d are drilled in the head 14b of the screw from the outer hexagonal faces of the screw in to the hole 14c. For this purpose there are mounted in horizontal supports 34 on the table 10 six drills 35 which are spaced 60° apart, each drill 35 being secured by a socket 36 to a spindle 37 extending axially through the horizontal support 34 and provided with a driving pulley 38. As will appear subsequently, three of the drills located 120° apart are moved inwardly and then outwardly simultaneously, whereupon the other three drills are moved inwardly and then outwardly. Each time the drills 35 are moved inwardly while rotated by the driving pulley 38 they drill the holes 14d in the screw head.

All the drills are driven by an electric motor 39 which is secured by a support 40 (Fig. 1) to the legs 11. This electric motor has at its upper end a pulley 41 which drives by means of a belt 42 a pulley 43 which is secured to or is formed as a part of the lower end of the driving member 30 which, as before stated, is keyed by a setscrew 29 to the driving sleeve 25.

Above the lower pulley 43 there is a series of six pulleys 44 which receive driving belts 45, one for each of the drill spindles 37. The belts 45 are endless and each passes around a lower sheave 46 on one side of one of the pulleys 44 to and around the driving pulley 38 on the drill spindle 37 and then around a similar sheave 47 and back to the driving pulley 44. As before stated, this same arrangement of driving belts 45 is provided for each of the six horizontal drill spindles 37 which rotate the drills 35, the six pulleys 44 being arranged one above the other on the periphery of the driving member 30. When the machine is in operation, the vertically movable drill 21 and the laterally movable drills 35 are operated constantly at fairly high speed. First the drill 21 is moved upwardly so as to drill the hole 14c in the head of the screw and is then retracted. Then three of the drills 35 are simultaneously moved inwardly so as to drill three holes 14d in the sides of the head of the screw, these holes being spaced 120° apart, and after these holes have been drilled and the drills retracted or while the drills are being retracted, the other three drills 35 are moved inwardly to drill the other three holes 14d and these drills are then retracted. This completes the drilling operations except that burrs are removed from the holes 14d of the screw by inserting the first mentioned three horizontal drills inwardly into the drilled holes 14d and then by inserting the drill 21 up into the hole 14c, these reaming movements occurring relatively rapidly.

For the purpose of operating all seven of the drills there is employed a cam 48 which is shown in Fig. 5 and which is rotatably supported on the lower side of the platform member 28 by an extension 49 thereof (see Fig. 4). Mounted in the extension 49 is a cam-operated plunger 50 for moving the vertical spindle and the drill 21 upwardly and six plungers 51 for moving the horizontal drills 35 and the drill spindles 37 laterally (see Fig. 5). The plunger 50 is operated by a push rod 52 (see Fig. 3) connected by an adjustable screw 53 to a bell crank lever 54 which is pivotally supported on an arm 55 secured to and extending downwardly from the table 10. The horizontal arm 54a of the bell crank 54 extends under and engages the lower end of the spindle 23 which drives the vertical drill 21. Thus, when the push rod 52 is moved outwardly by a high spot of the cam it elevates the spindle 23 and the drill 21, compressing the spring 31, this movement causing the drilling of the hole 14c in the screw head. When the push rod 52 and plunger 50 are permitted to move backward by the cam, the spring 31 lowers the spindle 23 and the drill 21 out of the hole which has been drilled in the screw head. The push rod 52 and plunger 50 are moved inwardly against the circular part of the cam by the spring 31.

The six plungers 51 are connected by push rods 56 to six equally spaced adjustable screws 57 which are carried at the lower end of rocker arms 58 (see particularly Fig. 1) which engage the outer ends of the spindles 37. The cam is so constructed that three of the push rods 56 and rocker arms 58 are operated to move inwardly simultaneously three of the horizontal drill spindles spaced 120° apart, thus drilling three holes 14d simultaneously in the screw head, and the cam is also so constructed that immediately upon the retraction of the three horizonal drills 35 the other three push rods 56 and rocker arms 58 are operated so as to move inwardly the remaining three drills spaced 120° apart so as to drill the other three holes 14d, it being remembered that all the drills are continuously rotated.

As shown in Fig. 5, the cam 48 has six high spots 48a which engage the plungers 50 and 51. As shown in Fig. 5, three of the high spots of the cam are in engagement with three of the plungers 51, these high spots having moved these three plungers outwardly for the full distance equivalent to the full inward movement of the three horizontal drills 35. As the cam is rotated further, the remaining three plungers are moved outwardly so as to complete the horizontal drilling operations. The plunger 50 connected to the push rod 52 is, in the cycle of operations, operated first by one of the high spots of the cam, it being remembered that by virtue of the single spring 31 and the six springs 58b surrounding the horizontal spindles, the plungers follow the high spots of the cam inwardly so as to be in position to be actuated when the cam is rotated.

The cam is operated first in one direction and then in the other by means of a hydraulic cylinder 59 and piston 60 (see Fig. 2), the cylinder 59 being supported below the level of the table 10 by means of an arm 61 (see Fig. 1). The piston 60 has attached to it a plunger 62 which is pivotally connected to an arm 63 (see Figs. 1 and 2) which, as shown in Fig. 4, is attached to the cam 48. Water under pressure is supplied to one side of the cylinder by means of a tube or pipe 64 and controlled by a three-way valve 65 (see Fig. 2) which has connected to it an arm 66 connected by a link 67 to an actuating lever 68 pivotally mounted on an arm 69 which is attached to the table 10 (see Fig. 2). The arm 63 has attached to it a spring 70 in which energy is stored to return the cam in the opposite direction. There is also attached to the arm 63 a rod 71 the outer end of this rod being connected to the arm 66 which is attached to the stem of valve 65 (see Fig. 2) through a lost motion connection indicated at 71a. There is mounted ahead of the valve 65 a pressure regulating valve 65a.

When the hand lever 68 which starts the operation of the hydraulic motor is thrown in one direction, the valve 65 is turned so as to admit water under pressure behind the piston. The forward movement of the piston through the arm 63 turns the cam 48 and the effect of this rotation is first to elevate the spindle 23 and the drill 21 so as to drill the hole 14c in the head of the screw. As the plunger 50 which is connected to the push rod 52 rides down a high spot of the cam, the drill spindle is withdrawn. Then following this the high spots of the cam meet the plungers connected to three of the push rods 56 which operate the drills 35 to drill three holes 14d spaced 120° apart, and as these plungers ride down the high spots of the cam, the drills are withdrawn by the springs 58b which surround the drill spindles 36. Further movement of the cam brings the high spots thereof opposite the other three plungers connected to the push rods 56 which operate the other three drills which drill the remaining three holes.

During the major portion of the forward movement of the piston 60 the rod 71, because of the lost motion connection 71a with the valve lever 66, has no effect on the valve 65, but when the cam reaches a given position, the valve 65 is closed by the rod 71. Then when the operator manipulates the lever 68 in the opposite direction to that to which the lever was moved to initiate the piston movement, the valve is opened in the opposite direction to release the pressure on the rear side of the piston and to allow the piston to return to its former position under the action of the spring 70. The spring 70 also restores the cam 48 to its original position.

In restoring the cam to its original position, the three plungers last referred to ride down the high spots of the cam, thus retracting the three spindels and drills associated with the plungers, and then the first mentioned three horizontal drills are moved inwardly and retracted, and then the vertical drill 21 is moved upwardly and retracted. The piston is now returned to its original position and the valve lever 66 is moved by the rod 71 to closed position. The effect of moving the first mentioned three drills inward and then retracting them and then moving the vertical drill upward and then retracting it is to ream out the holes 14d and 14c. During this reaming, movement of the cam in the reverse direction is rapid under the action of the spring 70 and the movement of the four drills just referred to is accelerated by reason of the shape of the high spots on the cam which high spots are more abrupt on one side than on the other.

The drilling having been completed, the handle 19 is raised to bring about the elevation of the sliding platform 17 so that the finished screw can be removed and replaced with a new or undrilled one.

At the bottom of the electric motor and attached to the lower end of the motor shaft is a pulley 72 which drives by means of a belt 73 a pulley 74 which is connected to a pump 75 which pumps coolant from a receptacle 76 placed beneath the machine. This coolant is pumped by the motor from a perforated receptacle located centrally of the receptacle 76 through a pipe 77 and delivers it by means of a delivery pipe 78 to the top of the socket 13 in the screw receiving member. The coolant, after cooling the drills, finds its way into a receptacle 79 which is located and supported on the underside of the table 10 (see Figs. 1 and 2) and finally is delivered by a pipe 80 to the receptacle 76.

Thus it will be seen that I have provided a machine which drills the radial and lateral holes in the screw head with great rapidity, it being understood that when a screw has been placed in the machine and water admitted to the rear end of the piston the radial hole is drilled, then three holes spaced 120° apart are drilled from the outer sides of the hexagonal head in to the inner bore 14c, then the remaining three lateral holes are drilled and the piston stops. On the reversal of the piston by the operator throwing the lever 68 in the opposite direction, the three holes first drilled are reamed and the axial hole is reamed, whereupon the operation stops and is repeated with a new screw.

While I have shown the preferred construction, I do not desire to be confined to the precise details shown and described but aim in my claims to cover all modifications which do not involve a departure from the spirit and the scope of the invention. For example, the word "screw" as used herein is inclusive of bolts, and the screw or bolt heads may have more or less than six faces.

Having thus described my invention, I claim:

1. In a machine for drilling holes in screw heads, a support for the screw to be drilled, a plurality of drills one arranged axially of the screw head and the remainder laterally thereof, the first named drill being adapted to drill a hole centrally of the head and the remainder being adapted to drill holes laterally thereof and into the bore formed by the first drill, means for rotating the drills and for moving them inwardly and outwardly to perform the drilling operations, the means for moving the drills inwardly and outwardly comprising an oscillatory cam having high and low spots thereon, a hydraulic motor having a piston for actuating the cam in one direction, means for operatively connecting the surface of the cam to the drills, a valve for controlling the supply of fluid to one side of the piston, means for closing the valve when the piston reaches a predetermined point, and means for causing the piston to be moved in the reverse direction.

2. In a machine for drilling holes in screw heads, a support for the screw to be drilled, a plurality of drills one arranged axially of the screw head and the remainder laterally thereof, the first named drill being adapted to drill a hole centrally of the head and the remainder being adapted to drill holes laterally thereof and into the bore formed by the first drill, means for rotating the drills and for moving them inwardly and outwardly to perform the drilling operations, the means for moving the drills inwardly and outwardly comprising an oscillatory cam having high and low spots thereon, a hydraulic motor having a piston for actuating the cam in one direction, means for operatively connecting the surface of the cam to the drills, a valve for controlling the supply of fluid to one side of the piston, means for closing the valve when the piston reaches a predetermined point, and spring means for moving the piston in the reverse direction.

3. In a machine for drilling holes in screw heads, a support for the screw to be drilled, a plurality of drills one arranged axially of the screw head and the remainder laterally thereof, the first named drill being adapted to drill a hole centrally of the head and the remainder being adapted to drill holes laterally thereof and into the bore formed by the first drill, means for rotating the drills and for moving them inwardly and outwardly to perform the drilling operations, the means for moving the drills inwardly and outwardly comprising an oscillatory cam having high and low spots thereon, a hydraulic motor having a piston for actuating the cam in one direction, means operatively connecting the surface of the cam to the drills, a valve for controlling the supply of fluid to one side of the piston, means for closing the valve when the piston reaches a predetermined point, and means for causing the piston to be moved in the reverse direction, the high spots of the cam being formed so that at least part of the drills will be again moved into the work so as to ream the holes.

4. In a machine for drilling holes in screw heads, a support for the screw to be drilled, a plurality of drills one arranged axially of the screw head and the remainder laterally thereof, the first named drill being adapted to drill a hole centrally of the head and the remainder being adapted to drill holes laterally thereof and into the bore formed by the first drill, means for rotating the drills and for moving them inwardly and outwardly to perform the drilling operations, the means for moving the drills inwardly and outwardly comprising an oscillatory cam having high and low spots thereon, a hydraulic motor having a piston for actuating the cam in one direction, means for operatively connecting the surface of the cam to the drills, a valve for controlling the supply of fluid to one side of the piston, means for closing the valve when the piston reaches a predetermined point, and spring means for moving the piston in the reverse direction, the high spots of the cam being formed so that at least part of the drills will be again moved at increased speed into the work so as to ream the holes.

5. In a machine for drilling holes in screw heads, a support for the screw to be drilled, a plurality of drills one arranged axially of the screw head and the remainder laterally thereof, the first named drill being adapted to drill a hole centrally of the head and the remainder being adapted to drill holes laterally thereof and into the bore formed by the first drill, means for rotating the drills and for moving them inwardly and outwardly to perform the drilling operations, the means for moving the drills inwardly and outwardly comprising an oscillatory cam having high and low spots thereon, a hydraulic motor having a piston for actuating the cam in one direction, push rods for operatively connecting the surface of the cam to the drills, a valve for controlling the supply of fluid to one side of the piston, means for closing the valve when the piston reaches a predetermined point, and spring means for moving the piston in the reverse direction, the high spots of the cam being formed so that at least part of the drills will be again moved into the work so as to ream the holes.

6. In a machine for drilling holes in screw heads, a support for the screw to be drilled, a plurality of drills one arranged axially of the screw head and the remainder laterally thereof, the first named drill being adapted to drill a hole centrally of the screw head and the remainder being adapted to drill holes laterally thereof and into the bore formed by the first drill, means for rotating the drills and for moving them inwardly and outwardly to perform the drilling operations, the means for moving the drills inwardly and outwardly comprising an oscillatory cam having high and low spots thereon, means for operatively connecting the surface of the cam to the drills, a hydraulic motor having a piston, a valve for controlling the supply of fluid to one side of the piston, a manually operated member for actuating the valve in one direction, a lever connected to the oscillatory cam and to the piston of the motor and serving to oscillate the cam, a rod connected to the lever and to the valve, said rod having a lost motion connection with one of the parts whereby the valve is actuated after a predetermined oscillatory movement of the cam.

7. In a machine for drilling holes in screw heads, a support for the screw to be drilled, a plurality of drills one arranged axially of the screw head and the remainder laterally thereof, the first named drill being adapted to drill a hole centrally of the screw head and the remainder being adapted to drill holes laterally thereof and into the bore formed by the first drill, means for rotating the drills and for moving them inwardly and outwardly to perform the drilling operations, the means for moving the drills inwardly and outwardly comprising an oscillatory cam having high and low spots thereon, means for operatively connecting the surface of the cam to the drills, a hydraulic motor having a piston, a valve for controlling the supply of fluid to one side of the piston, a manually operated member for actuating the valve in one direction, a lever connected to the oscillatory cam and to the piston of the motor and serving to oscillate the cam, a rod connected to the lever and to the valve whereby the valve is actuated after a predetermined oscillatory movement of the cam, and a spring connected to said lever for returning the piston to its original position and for moving the cam in the reverse direction.

MARION W. HUMPHREYS.